J. P. Zeller.
Cultivator.
Nº 92,686.        Patented July 13, 1869.
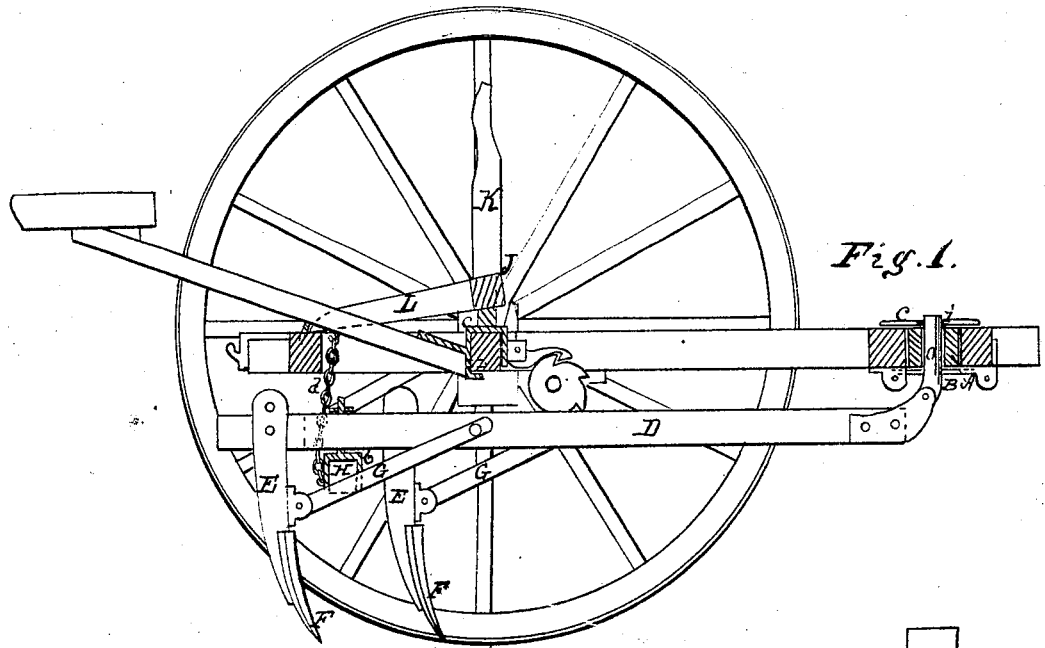
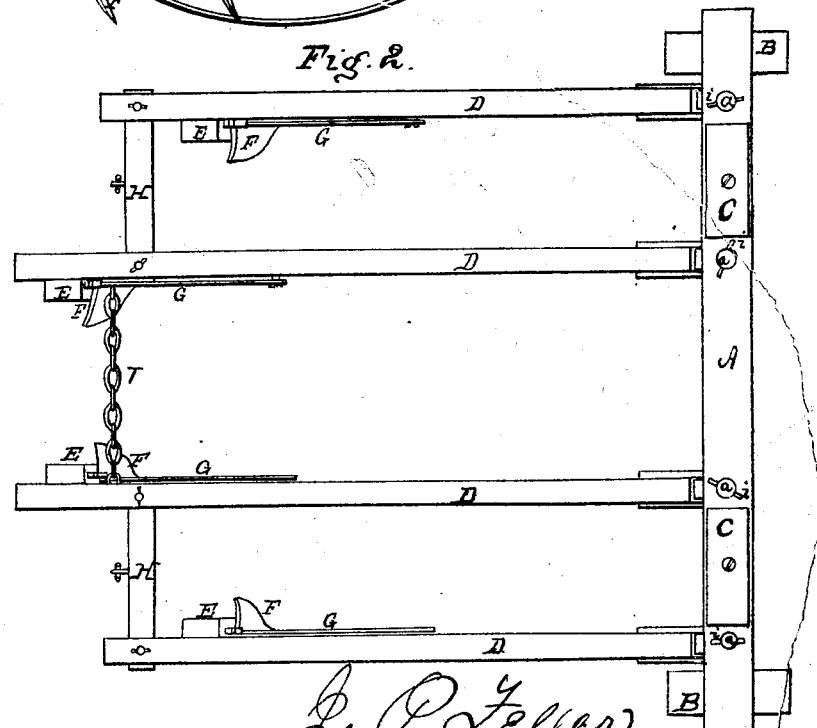
Witnesses
Harry King
Leopold Evert
J. P. Zeller
Alexander Mason
Attys.

UNITED STATES PATENT OFFICE.

JOHN P. ZELLER, OF SOUTH BEND, INDIANA.

IMPROVEMENT IN CULTIVATORS.

Specification forming part of Letters Patent No. 92,686, dated July 13, 1869.

*To all whom it may concern:*

Be it known that I, JOHN P. ZELLER, of South Bend, in the county of St. Joseph, and in the State of Indiana, have invented an Attachable Corn-Cultivator; and I do hereby declare that the following is a full, clear, and exact description thereof, reference being had to the accompanying drawings, and to the letters of reference marked thereon.

The nature of my invention consists in the construction and arrangement of a "corn-cultivator" in such a manner that it can be adjusted upon a carriage so constructed that when the cultivator is removed other agricultural implements may be adjusted upon the same.

In order to enable others skilled in the art to which my invention appertains to make and use the same, I will now proceed to describe its construction and operation, referring to the annexed drawings, which form a part of this specification, and in which—

Figure 1 is a longitudinal vertical section, and Fig. 2 a plan view.

In the drawings I have represented the carriage to which my cultivator is adjusted in red. This carriage is so constructed that the frame can be raised or lowered at will.

A represents a bar of suitable size to fit in between the two cross-bars in the front end of the carriage. The bar A is provided on its under side with two or more stationary buttons, B B, the ends of which project on the sides of the bar, and on the upper side are other buttons, C C, which can be turned, so that when the bar A is inserted between the cross-bars of the carriage the buttons B B rest up against the under side of the cross-bars, and when the buttons C C are turned they rest on top of the cross-bars, thus holding the bar A steady in its place.

To the under side of the bar A are pivoted four beams, D D, by means of vertical pins *a a*, which pass through the bar A, and are, at their lower ends, hinged to the front ends of said beams. The vertical pins *a a* are held on the upper side of the bar A by means of small pins *i i* passed through the same, or by collars or any other suitable means.

At suitable points near the rear ends of the beams D D are secured the plow-beams E E, to the lower ends of which are fastened the plows F F. The plow-beams E E are further steadied by braces G G, as seen in Fig. 1. The beams D D are connected together in groups of two by means of cross-bars H H, pivoted in brackets *b b* on their under side, and the two groups are connected by a chain, I, as seen in Fig. 2.

On a cross-bar of the carriage are placed two brackets, *c c*, between which is pivoted a bar, J, having a handle, K, and two arms, L L. These arms are, by chains *d d*, connected with the cross-bars H H, said chains being adjustable, so that the plows F F can be made to work at any depth desired in the ground, and also, by use of the handle K, be lifted entirely out of the ground.

It will be seen that by merely turning the buttons C C and removing the brackets *c c* the whole cultivator will become detached from the carriage and any other implement attached to the same.

Having thus fully described my invention, what I claim as new, and desire to secure by Letters Patent, is—

1. The arrangement of the bar A, stationary buttons B B, and movable buttons C C, substantially as and for the purposes set forth.

2. The arrangement of the bar A, vertical pins *a a*, and beams D D, the latter having the plow-beams E E, plows F F, and braces G G, all substantially as shown and described.

3. The arrangement of the beams D D, brackets *b b*, bars H H, and chain I, all substantially as shown and described.

4. The arrangement of the brackets *c c*, bar J, handle K, arms L L, and chains *d d*, all substantially as shown and described.

5. The combination of the bar A, buttons B C, beams D D, plows F F, connecting-bars H, brackets *c c*, bar J, handle K, arms L L, and chains *d d*, all constructed and arranged, as described, on an adjustable carriage, so that said carriage may be used with any other agricultural implement, if properly constructed, substantially as herein set forth.

In testimony that I claim the foregoing I have hereunto set my hand this 30th day of March, 1869.

JOHN P. ZELLER.

Witnesses:
　CR. H. NULL,
　JOHN H. NULL.